United States Patent Office.

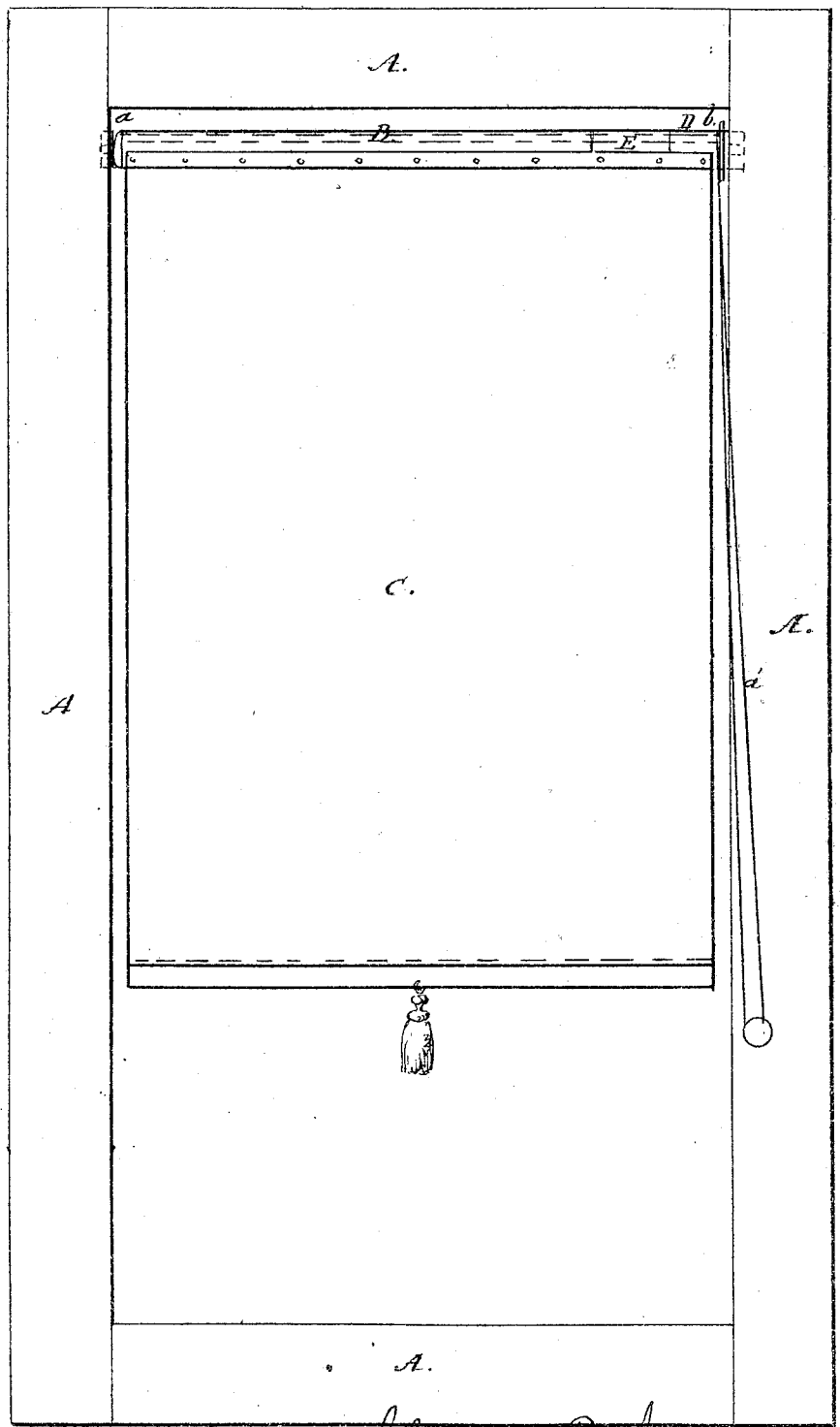

CHARLES R. JENKINS, OF PHILADELPHIA, PENNSYLVANIA.

Letters Patent No. 73,811, dated January 28, 1868.

IMPROVED CURTAIN-FIXTURE.

*The Schedule referred to in these Letters Patent and making part of the same.*

TO ALL WHOM IT MAY CONCERN:

Be it known that I, CHARLES R. JENKINS, of the city and county of Philadelphia, and State of Pennsylvania, have invented a new and improved Fixture for Curtain, Shades, &c.; and I do hereby declare the following to be a clear and exact description thereof, sufficient to enable others skilled in the art to which my invention appertains to fully understand and use the same, reference being had to the accompanying drawings, making part of this specification, in which the figure is a front view of the device illustrating my invention.

My invention consists in applying to the ordinary roller a soft rubber tube or roll, which shall form a continuation of said roll, whereby the curtain or shade can be wound on both as ordinarily, and the roller be firmly pressed in its bearings, and thereby hold the curtain or shade at any desired height, without any other means of retention, as will be hereinafter more fully described.

In the drawings, A represents a window-frame, at the upper end of which is mounted a metallic or wooden roller, B, on which an ordinary shade or curtain, C, is wound. One end of the roller B has secured to it a metallic cap, a, and a pintle, which enters a proper opening on the window-frame, or may rest on the ordinary bracket, secured to the frame. The other end of the roller has also a pintle, and a similar cap, b, which is secured to a rubber roll or tube, D. The roll or tube D is constructed of soft rubber, and is of the same shape and form as the roller B, and is connected at one end to said roller, and thus forms a continuation thereof, and its other end is attached to the cap b, as has been previously stated. The means for connecting the rubber, to the roller B are either by employing a rigid tube, E, which receives one end of the roller and of the rubber or by hollowing out one end of the roller and inserting the rubber therein, or *vice versa*.

It will be perceived that the rubber is thus interposed between the cap b and the roller B, and thereby keeps them extended; consequently the tendency of said rubber is to force the caps against the brackets or side of frames, and thus cause friction between them. Now, if the roller is rotated, and rolls up the curtain or shade, it cannot unroll itself, owing to the friction stated. The friction is sufficient for this purpose, but may be overcome by using the ordinary cord a', which winds and unwinds the shade or curtain, and which may be passed around the rubber tube or roll D.

A great advantage in this is, that I dispense with any means for tightening the cord, for when it has once been fastened, and stretches from use, the rubber roll will take up the slack and always keep it taut. The metallic or rigid tube E may be secured to the roller B by pins or nails passing through suitable openings, which also form means for attaching the curtain or shade to the roller. The pintle of cap b passes through the cap and penetrates the rubber roll D, and, if desired, the roller B, and thereby holds the parts together, or a pin may pass longitudinally through the rubber and wooden roller, and fit tightly therein, thus dispensing with the caps a b.

The curtain or shade may be readily nailed or fastened to the rubber portion of the roller; consequently it can be made of the full width of the window-frame. The rubber portion, therefore, assumes all the functions of the wooden roller, yet by its elasticity has the additional feature of preventing the accidental unwinding of the shade or curtain, by pressing the ends of the roller or the caps thereon against the window-frame, or the brackets supporting the roller. A groove may be formed on the rubber, so as to receive the cord a', and the friction between the two will prevent the latter from slipping off. The ordinary grooved cap may be used when desired, and need only be secured to the rubber or the opposite end of the roller B, or the cap b may be somewhat larger than the roller, so as to leave a flange, which will prevent the cord from slipping off in one direction, while the curtain or shade prevents it in the other.

In applying the roller, the yielding side is first applied to the bracket or eye in the frame, and then pressed firmly until the unyielding or opposite side of the roller clears the frame, and made to enter and rest on its bearings. The elasticity of the rubber then causes the pintles to bear away from each other and be held firmly in place. The roller is, however, easily rotated, but will not rotate unless power is applied thereto.

I am aware that springs have been applied to the rollers, but they are of a more complicated nature, and do not form continuations of the wooden roller so as to allow the attachment of the curtain or shade directly to them. I thereby claim a decided improvement over them in simplicity, utility, and cheapness.

Having thus described my invention, what I claim as new, and desire to secure by Letters Patent, is—

Interposing between pulley-cap and roller a tube of India rubber, yielding laterally and vertically, as and for the purpose described, and serving itself as a pulley for the cord.

To the above I have signed my name, this ninth day of December, 1867.

CHARLES R. JENKINS.

Witnesses:
WM. A. WIEDERSHEIM,
WILLIAM WALTON.